United States Patent [19]

Nakaho et al.

[11] Patent Number: 4,693,558
[45] Date of Patent: Sep. 15, 1987

[54] GLARE PREVENTIVE REAR VIEW MIRROR

[75] Inventors: Junichi Nakaho; Shigeru Kato; Makoto Shibahara, all of Ooguchi, Japan

[73] Assignee: Kabushiki Kaisha Tokai Rika Denki Seisakusho, Niwa, Japan

[21] Appl. No.: 713,684

[22] Filed: Mar. 20, 1985

[30] Foreign Application Priority Data

Mar. 28, 1984 [JP] Japan ............................ 59-44794[U]

[51] Int. Cl.⁴ ............................................. H01J 39/12
[52] U.S. Cl. ...................................... 350/332; 350/642
[58] Field of Search ................... 350/331 R, 332, 334, 350/642, 600; 250/215, 213 R

[56] References Cited

U.S. PATENT DOCUMENTS 4,161,653 7/1974 Bedini et al. ..................... 350/332

FOREIGN PATENT DOCUMENTS 2808260 2/1978 Fed. Rep. of Germany ...... 350/332

Primary Examiner—Arthur G. Evans
Attorney, Agent, or Firm—Cushman, Darby & Cushman

[57] ABSTRACT

A rear view mirror assembly comprising a liquid crystal cell of guest-host type which consists of a layer of dichroic dyestuff added nematic liquid crystal and a pair of transparent plates sandwiching the liquid crystal therebetween. A transparent electrode is formed on the inside surface of each plate by means of conductive coating. A quarter wave phase difference filter is mounted on the backside of one of the plates. A flat mirror is mounted on the backside of the quarter wave phase difference filter. A photo-sensitive means receives light passing through the liquid crystal cell and an optical polarization filter in turn and produces a photo-detector signal. A control circuit controls voltage applied to the electrodes of liquid crystal cell so that the magnitude of photo-detector signal may become equal to the predetermined level. The predetermined level is changeable in accordance with the magnitude of detector signal produced by another photo-sensitive means for detecting circumjacent light.

2 Claims, 5 Drawing Figures

GLARE PREVENTIVE REAR VIEW MIRROR

BACKGROUND OF THE INVENTION (1) Field of the Invention

The present invention relates to a rear view mirror assembly, and more particularly to a glare preventive rear view mirror assembly having a liquid crystal cell of guest-host type in which the optical transmittance changes in accordance with voltage applied to the liquid crystal cell.

(2) Description of the Prior Art

A rear view mirror assembly having a liquid crystal cell of guest-host type has recently been introduced for the automotive use. The mirror assembly has a flat mirror plate attached to one side of the liquid crystal cell or positioned behind the cell. The transmittance of the cell varies with the change of voltage applied to the cell.

An amount of light impinging on the mirror, however, depends on conditions surrounding the automotive vehicle, that is, the amount of light varies with the position of the following vehicle or the type and kind of headlamps of the following vehicle. Accordingly the transmittance of the liquid crystal cell must be adjusted whenever the amount of light impinging on the mirror changes. Further the transmittance of the cell unavoidably undergoes changes because of dimensional deviation caused during manufacturing process, the influence of the ambient temperature or deterioration from aging. These conditions render it difficult to get enough glare preventive effect from the mirror.

SUMMARY OF THE INVENTION

It is therefore an object of the invention to provide a glare preventive rear view mirror assembly wherein the transmittance of the liquid crystal cell can automatically be controlled so as to become equal to the predetermined level.

It is another object of the invention to provide a glare preventive mirror assembly wherein constant reflection can be secured under the circumstances permitting dimensional deformation, influence of the ambient temperature or deterioration from aging.

According to the invention, a liquid crystal cell of guest-host type comprises a layer of dichroic dyestuff add nematic liquid crystal and a pair of transparent plates. The layer of liquid crystal is sandwiched between the plates. Conductive coating is applied to the inside surface of each plate and thereby electrode is formed. A quarter wave phase difference filter and a flat mirror plate are respectively positioned behind the cell or mounted on the backside of the cell. A photo-sensitive means receives light passing at least through the liquid crystal cell and an optical polarization filter in turn and thereby produces a photo-receptor signal in accordance with the amount of received light. The phto-receptor signal is given to a control circuit which controls voltage supplied to the electrodes of the cell so that the magnitude of photo-receptor signal may correspond with the predetermined level.

Another photo-sensitive means mounted, for example, on the projecting rod for securing the mirror assembly detects circumjacent light other than that from headlamps of the following vehicle and produces a photo-detector signal in accordance with the amount of received light. The detector signal is given to the control circuit which changes the predetermined level lest it should deviate far from the amount of circumjacent light other than that from headlamps of the following vehicle.

According to the invention, the transmittance of the liquid crystal cell is automatically controlled irrespective of the amount of light impinging on the mirror. In consequence the glare preventive mirror of the invention is effective against changes because of dimensional deviation caused during manufacturing process, ambient temperature or deterioration from aging.

These and other objects and many of the attendant advantages of this invention will readily be appreciated as the same becomes better understood by reference to the following detailed description when considered in connection with the accompanying drawings.

DESCRIPTION OF THE PREFERRED EMBODIMENTS

Figure 1:
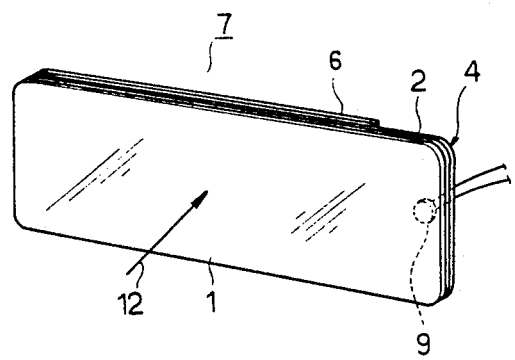
FIG. 1 is a perspective view showing a rear view mirror assembly of a first embodiment.
Figure 2:
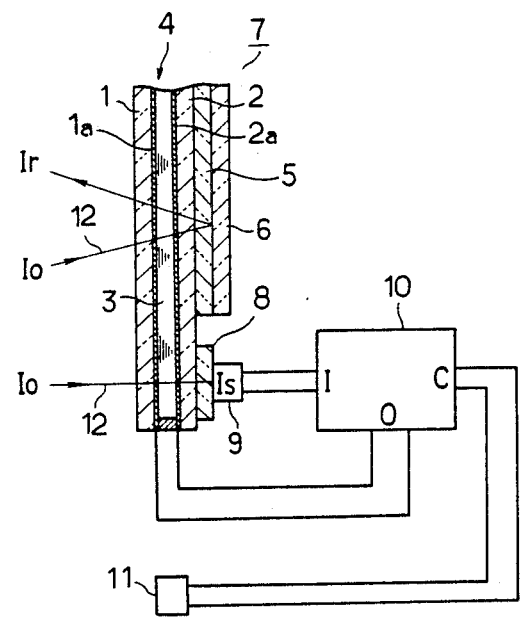
FIG. 2 is a partly semi diagrammatical transverse view according to the first embodiment showing an electrical construction therewith.
Figure 3:
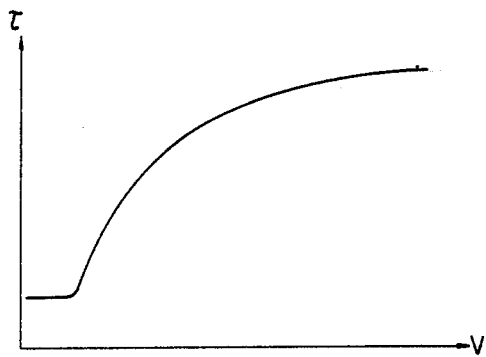
FIG. 3 is a graphical representation showing an electrooptical characteristic of the liquid crystal cell of the invention.

FIGS. 1-3 illustrate a first embodiment of the invention. Referring now to FIGS. 1 and 2, numerals 1 and 2 designate rectangular parallel plates made of a transparent material, for example, glass. A layer of nematic liquid crystal 3 to which dichroic dyestuff is added is sandwiched between the plates 1 and 2. Transparent conductive coating is applied over the inside surfaces of the plates 1 and 2 by means of metallizing or sputtering and thereby electrodes 1a and 2a are formed. Thus a liquid crystal cell 4 of guest-host type consists of a layer of nematic liquid crystal 3, a pair of plates 1 and 2 and electrodes 1a and 2a. A quarter wave phase difference filter 5 is mounted on the outside surface of the plate 2. The filter 5 may be positioned behind the plate 2. A flat mirror 6 is mounted on the backside of the filter 5. Thus the mirror assembly 7 consists of the liquid crystal cell 4, the quarter wave phase difference filter 5 and the flat mirror 6. The flat mirror 6 and the quarter wave phase difference filter 5 are adapted to be smaller than the plates 1 and 2 in horizontal length as shown in FIG. 1.

An optical polarization filter 8 is mounted on the right end of outside surface of the plate 2. The mirror assembly 7 thus constructed is secured on the upper portion of front window of the automotive vehicle.

A phto-sensitive means 9 such as a photo-transistor is mounted on the backside of the filter 8. The photo-sensitive means 9 receives part of light impinging on the mirror assembly and produces a photo-receptor signal the magnitude of which corresponds with an amount of received light. The signal produced by the photo-sensitive means 9 is given to an input terminal I of a control circuit 10 which will hereinafter be described. Another photo-sensitive means 11 is mounted on the projecting rod for securing the mirror assembly. The photo-sensitive means 11 receives circumjacent light other than that from headlamps of the following vehicle, and produces a detector signal the magnitude of which corresponds with an amount of receive light. The detector signal is given to a control terminal C of the control circuit 10.

When voltage from an output terminal O of the circuit 10 is applied to the electrodes 1a and 2a of the liquid crystal cell 4, it shows a characteristic illustrated in FIG. 3 in which the horizontal axis denotes voltage applied to the electrodes of the cell 4 and the vertical axis denotes transmittance $\tau$ of the cell 4.

The glare preventive rear view mirror described above operates as follows. Light 12 incident on the mirror assembly 7, passing through the liquid crystal cell 4 and the quarter wave phase difference filter 5, is reflected on the flat mirror 6. Accordingly an amount of light reflected on the flat mirror 6 depends on how much light passes through the liquid crystal cell 4. Part of light 12, after passing through the cell 4, is received through the optical polarization filter 8 by the photo-sensitive means 9 and thereby the photo-sensitive means 9 produces the photo-receptor signal the magnitude of which corresponds with the amount of received light. The amount of light reflected on the mirror assembly 7 is as follows, $$Ir = \frac{a \cdot Is}{1 + Vp} - \frac{1 - Vp}{1 + Vp} \cdot b \cdot Io \quad (1)$$

where
Ir = the amount of light reflected on the mirror assembly 7
Io = the amount of light incident on the mirror assembly 7
Is = the amount of light received by the photo-sensitive means 9
Vp = polarization coefficient of the filter 8
a = a constant, b = a constant The second term of the equation (1) can be omitted when the value 0.99 which is technically possible is substituted for the polarization coefficient Vp of the filter 8, $$Ir \approx (a \cdot Is)/2 \quad (2)$$

Accordingly the amount of light reflected on the mirror assembly 7 is proportionate to the amount of light received by the photo-sensitive means 9, that is, the magnitude of photo-receptor signal is proportionate to the amount of light reflected on the mirror assembly 7. When the photo-receptor signal from the photo-sensitive means 9 is given to the input terminal I of the control circuit 10, the circuit changes voltage from the output terminal O so that the magnitude of photo-receptor signal may correspond with the predetermined level and thereby the transmittance of the liquid crystal cell 4 is adjusted. For example, the amount of light passing through the cell 4 increases when light from headlamps of the following automotive vehicle impinges on the mirror assembly 7, and the photo-sensitive means 9 also increases the magnitude of signal. Consequently the circuit 10 operates to decrease voltage from the output terminal O and thereby the transmittance of the cell 4 is decreased. When light from the headlamps of the following vehicle ceases to impinge on the mirror assembly 7, the amount of light passing through the cell 4 decreases and thence the photo-sensitive means 9 decreases the magnitude of signal. The circuit 10 operates to increase voltage from the output terminal O and thereby the transmittance of the cell 4 is increased. Thus the control circuit 10 controls output voltage so that the magnitude of photo-receptor signal from the photo-sensitive means 9 may correspond with the predetermined level and therby the amount of light reflected on the mirror assembly 7 is kept at a fixed level.

Whether light reflected on the mirror assembly 7 is glare and dazzling or not to the driver depends on its relationship to the amount of circumjacent light other than that from headlamps of the following vehicle. The amount of light reflected on the mirror assembly 7 would tend to be insufficient if the amount is kept at a fixed level. The control circuit operates to cope with such a case in cooperation with the second photo-sensitive means 11. The circuit 10 has a selective function that it changes the predetermined level to another one to compare with the photo-receptor signal in accordance with the magnitude of detector signal from the photo-sensitive means 11. The circuit 10 selects a larger predetermined level when the magnitude of detector signal is intense with circumjacent light is abundant, and conversely the circuit selects smaller level when the magnitude of detector signal is weak with cicumjacent light is scarce.

Figure 4:
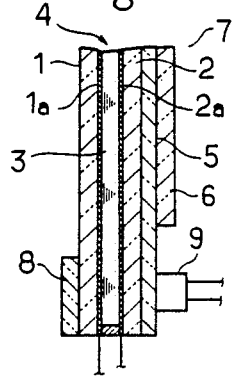
FIG. 4 is a view similar to FIG. 2 according to a second embodiment.
Figure 5:
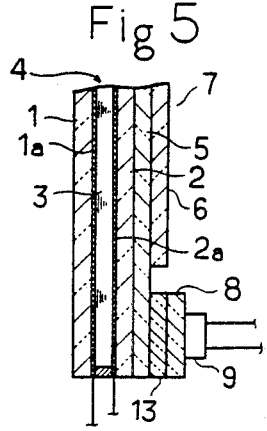
FIG. 5 is a view similar to FIG. 2 according to a third embodiment.

FIGS. 4 and 5 show second and third embodiments of the invention respectively in which parts identical to those of the first embodiment are shown by the same numerals. In the second embodiment the optical polarization filter 8 is mounted at the right end on the outside surface of the plate 1. The quarter wave phase difference filter 5 extends in the right direction and terminates at the right end of the plate 2. The photo-sensitive means 9 is mounted on the inside surface of the extending portion of the filter 5. Part of light impinging on the mirror assembly is received by the photo-sensitive means 9 through the optical polarization filter 8, the liquid crystal cell 4 and the quarter wave phase difference filter 5 in turn.

In the third embodiment shown in FIG. 5, the quarter wave phase difference filter 5 extends in the same manner as that of the second embodiment. Further, another quarter wave phase difference filter 13 is mounted on the backside of extending portion of the filter 5. The optical polarization filter 8 is positioned on the backside of the filter 13. The photo-sensitive means 9 is mounted on the backside of the filter 8. Part of light impinging on the mirror assembly passes through, in turn, the liquid crystal cell 4, the filters 5 and 13 and the optical polarization filter 8, and is received by the photo-sensitive means 9. The afore-mentioned equations (1) and (2) hold in the constructions of the second and third embodiments.

As a photo-sensing means for detecting circumjacent light, a manually operated variable resistor means may be provided in place of the photo-sensitive means 11.

Although the invention has been described in its preferred form with a certain degree of particularity, it will be obvious to those skilled in the art that various changes and modifications may be made thereto without departing from the scope and spirit of the invention, and it is, therefore, intended to cover in the appended claims all such changes and modifications as fall within the scope and spirit of the invention.

What is claimed is:

1. A glare preventive rear view mirror comprising:

a liquid crystal cell of the guest-host type including a pair of parallel transparent plates each having a transparent electrode on the inwardly desposed surface thereof and a mixture of nematic liquid crystal and dichroic dyestuff encapsulated between said transparent plates;

a mirror assembly including a quarter wave phase difference filter and a flat mirror each disposed on the side of said liquid crystal cell opposite a light receiving side thereof;

an optical polarization filter mounted on a side of said liquid crystal cell;

a photo-sensitive means for receiving light passing through at least said liquid crystal cell and said optical polarization filter, said photo-sensitive means being adapted to produce a photo-receptor signal in accordance with a quantity of received light; and a control circuit means for controlling voltage applied to the electrodes of said liquid crystal cell so as to adjust the quantity of light passing through said liquid crystal cell and so that the magnitude of the photo-receptor signal can correspond with a predetermined level.

2. A glare preventing rear view mirror as in claim 1, wherein said photo-sensitive means includes means for producing a photo-detector signal in accordance with sensed ambient light and wherein said control circuit means includes means for changing said predetermined level in accordance with the magnitude of said photo-detector signal.

* * * * *